US011126179B2

(12) United States Patent
Karasev et al.

(10) Patent No.: US 11,126,179 B2
(45) Date of Patent: Sep. 21, 2021

(54) MOTION PREDICTION BASED ON APPEARANCE

(71) Applicant: Zoox, Inc., Foster City, CA (US)

(72) Inventors: Vasiliy Karasev, San Francisco, CA (US); Tencia Lee, San Francisco, CA (US); James William Vaisey Philbin, Palo Alto, CA (US); Sarah Tariq, Palo Alto, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 259 days.

(21) Appl. No.: 16/282,201

(22) Filed: Feb. 21, 2019

(65) Prior Publication Data

US 2020/0272148 A1 Aug. 27, 2020

(51) Int. Cl.
G05D 1/00 (2006.01)
G01S 17/50 (2006.01)
G01S 13/58 (2006.01)
G05D 1/02 (2020.01)
G06N 20/20 (2019.01)
G06N 20/10 (2019.01)

(52) U.S. Cl.
CPC ............ *G05D 1/0088* (2013.01); *G01S 13/58* (2013.01); *G01S 17/50* (2013.01); *G05D 1/0246* (2013.01); *G05D 1/0257* (2013.01); *G06N 20/10* (2019.01); *G05D 2201/0213* (2013.01); *G06N 20/20* (2019.01)

(58) Field of Classification Search
USPC ......................................................... 701/28
See application file for complete search history.

(56) References Cited

U.S. PATENT DOCUMENTS

| 10,671,076 | B1 * | 6/2020 | Kobilarov | ............ G05D 1/0255 |
|---|---|---|---|---|
| 2010/0191391 | A1 | 7/2010 | Zeng | |
| 2015/0266488 | A1 | 9/2015 | Solyom et al. | |
| 2017/0206464 | A1 * | 7/2017 | Clayton | ............... G06N 3/0445 |
| 2018/0178791 | A1 * | 6/2018 | Zhu | .................... B60W 50/0097 |
| 2018/0203450 | A1 * | 7/2018 | Zhu | ........................ B60K 31/00 |
| 2018/0365888 | A1 | 12/2018 | Satzoda et al. | |
| 2018/0374359 | A1 * | 12/2018 | Li | ........................ G05D 1/0221 |
| 2019/0025841 | A1 * | 1/2019 | Haynes | .............. G01C 21/3492 |
| 2020/0086855 | A1 * | 3/2020 | Packer | ................... G08G 1/161 |
| 2020/0174481 | A1 * | 6/2020 | Van Heukelom | .... G05D 1/0088 |

OTHER PUBLICATIONS

The PCT Search Report and Written Opinion dated Apr. 23, 2020 for PCT Application No. PCT/US2020/015186, 10 pages.

* cited by examiner

*Primary Examiner* — Tyler D Paige
(74) *Attorney, Agent, or Firm* — Lee & Hayes, P.C.

(57) ABSTRACT

Techniques for determining and/or predicting a trajectory of an object by using the appearance of the object, as captured in an image, are discussed herein. Image data, sensor data, and/or a predicted trajectory of the object (e.g., a pedestrian, animal, and the like) may be used to train a machine learning model that can subsequently be provided to, and used by, an autonomous vehicle for operation and navigation. In some implementations, predicted trajectories may be compared to actual trajectories and such comparisons are used as training data for machine learning.

20 Claims, 5 Drawing Sheets

MOTION PREDICTION BASED ON APPEARANCE

BACKGROUND

A relatively important part of a navigation system for an autonomous vehicle is a perception system, which utilizes a variety of data from sensors on board the autonomous vehicle. The perception system allows the autonomous vehicle to recognize objects in the environment so that the autonomous vehicle can plan a safe route through the environment. The safe operation of an autonomous vehicle depends at least in part on information made available by the perception system in detecting, classifying, and predicting motion of objects. Thus, inaccurate and/or incomplete information provided by such detection, classification, and/or prediction of objects can reduce the safety with which autonomous vehicles can operate. This shortcoming may be significant in view of objects, such as pedestrians, that change their trajectory in a relatively short time span.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
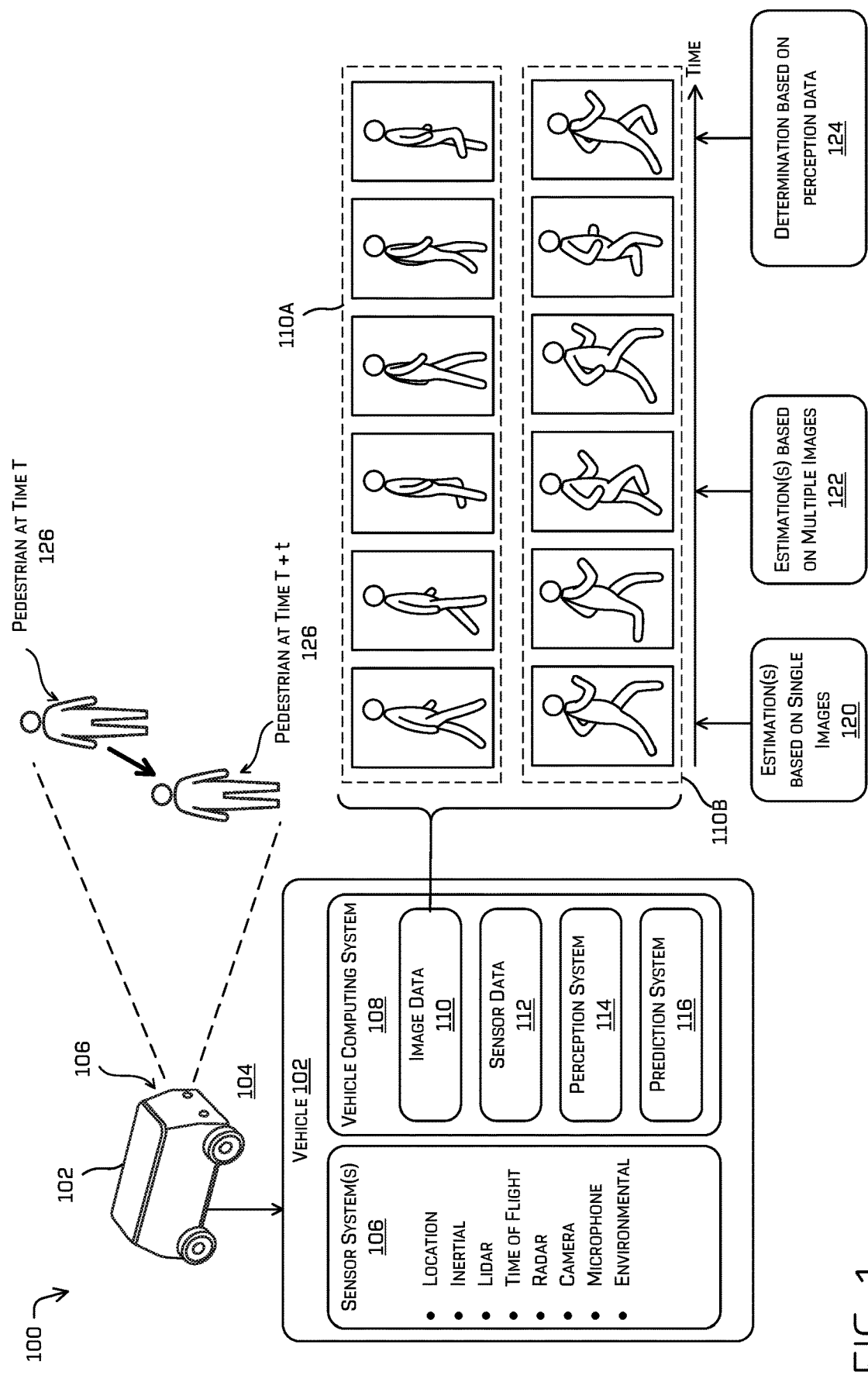
FIG. 1 illustrates an example environment that includes a vehicle having a neural network trained to predict object motion based on image data of an object, as described herein.

Techniques described herein are directed to determining and/or predicting a trajectory of an object by using the appearance of the object, as captured in image data including one or more images. The predicted trajectory may be used by an autonomous vehicle for operation and navigation. In some implementations, predicted trajectories may be compared to actual trajectories and such comparisons are used to generate training data for machine learning.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

Though techniques described herein may be applied to any number of types of objects, descriptions and examples focus on pedestrians. The techniques described herein may be especially applicable to pedestrians (also referred to herein as "people" or "person(s)") since they have characteristics, such as being able to alter their trajectory relatively quickly. Also, appearance pose of pedestrians can provide clues as to the current trajectory (e.g., state of motion), and/or future trajectory of the pedestrian. Appearance pose is a characteristic of a pedestrian which can be captured in an image. For example, appearance pose may include arm swing, configuration of the legs, torso angle, gaze direction, and so on. For example, a pedestrian about to step off a sidewalk to walk across a street may have a pose of forward lean, one leg in front of the other, and so on. On the other hand, a standing pedestrian may have a pose of both legs relatively straight and together, no lean. A pedestrian running may have a longer stride and/or arms swinging, and so on. Details of poses and associated trajectories, for example, may be a feature that is learned by a machine learning model, such as a neural network.

Pose of a pedestrian, which may be used to determine a predicted trajectory and/or current trajectory, may be used in conjunction with sensors or detectors for operating or navigating an autonomous vehicle (herein after, "vehicle"). For example, information from a sensor system on board a vehicle may be provided to a perception system that monitors the environment surrounding the vehicle. Such monitoring may be performed and updated periodically. In a case where the frequency or speed of updates is limited (e.g., due to limited sample rates or speeds of sensors or detectors or limited by computational considerations), some aspects of the surrounding environment can change significantly between the updates. In particular, pedestrians can change their trajectories quickly. Because pose is determined from images captured by cameras having relatively fast updates, pose may be used with data from the sensor system to effectively increase the speed or frequency of updates for monitoring the surrounding environment. In a particular example, a perception system may have a monitoring update cycle period of about 100 milliseconds (ms), whereas a vision system (e.g., which includes one or more cameras) may have an update cycle period of about 50 ms. In such a case, several updates of a perception system may be necessary to detect motion of an object (e.g., a pedestrian). Thus, for a perception system that updates every 100 ms, it may take 200-300 ms or more to detect motion of the object. On the other hand, according to the techniques described herein, based on pose of the pedestrian in a single image current motion may be detected and future motion of a pedestrian may be predicted in as little as 10-50 ms. This may increase the speed with which the vehicle can react to actions of pedestrians and/or may increase the confidence with which the vehicle plans a route through the environment. In other examples, the relative update speeds of the perception and vision systems may be greater or lesser than the examples provided.

As a non-limiting example, techniques described herein may be performed, at least in part, by a computing device of an autonomous vehicle, which may receive sensor data and detect one or more objects in an environment and/or determine attributes or object parameters of the one or more objects (e.g., pedestrians) in the environment. Object parameters may comprise velocity, acceleration, position, classification, and/or extents of each of the one or more objects, in addition to any uncertainty information associated therewith. Sensor data captured by the autonomous vehicle may include light detection and ranging (lidar) sensor data, radio detection and ranging (radar) sensor data, sound navigation and ranging (sonar) sensor data, image data, time of flight data, and the like. In some cases, sensor data may be provided to a perception system configured to determine a type of object (e.g., vehicle, pedestrian, bicycle, animal, parked car, tree, building, and the like) in the environment. Further, the perception system can determine, based on the sensor data, movement information about the object in the environment.

In some instances, the computing device of the autonomous vehicle can utilize the object(s) and/or the attributes of the object(s) to determine which object(s) should be considered when determining a drivable area, to determine extents of the drivable area, to determine a trajectory, to modify an existing trajectory, and/or to navigate the autonomous vehicle in the drivable area. In some examples, whether to modify a drivable area and/or trajectory can be determined, at least in part, by considering one or more costs and/or constraints associated with vehicle dynamics of a predicted trajectory.

The computing device(s) may also use probabilistic information about the objects to determine the safety level and/or the offset distance of the vehicle relative to the object. For instance, the computing device(s) may apply probabilistic filtering to the distance determinations, for example, to account for uncertainty associated with the object trajectory. For instance, uncertainty may be associated with the measurements, e.g., with calibration and/or tolerances of sensors and/or sensor components, with motion of the sensed objects, e.g., uncertainty associated with potential future movement of objects or prediction models that characterize the movement, or the like.

Techniques described herein are directed to leveraging sensor and perception data to enable a vehicle, such as an autonomous vehicle, to navigate through an environment while following or circumventing objects in the environment. For example, one or more trajectories can be generated based on prediction probabilities and such trajectories may be provided to a planner system to control an operation of the autonomous vehicle In some examples, a prediction system of a computing device of the autonomous vehicle can include a machine learning model trained to output data that can be used to generate one or more predicted trajectories of objects proximate to the autonomous vehicle. For example, the machine learning model can output coordinates (e.g., x-coordinates and y-coordinates) associated with the object (e.g., a third-party vehicle) at one or more times in the future (e.g., 1 second, 2 seconds, 3 seconds, etc.). In some examples, the machine learning model can output coordinates associated with the object as well as probability information associated with each coordinate. However, other machine learning models are also contemplated. In some implementations, the machine learning model can output a heat map associated with prediction probabilities. Also, results of some methods described herein may be used to improve heat maps. As a non-limiting example, the detected pose of the pedestrian (appearance and/or geometric) and/or the output velocity of the pedestrian may provide additional features for input into such additional machine learned models, the result of which comprising additional data for determining likely positions of the pedestrian in time (such as may be represented in a heat map as output by one or more of the machine learned models). In some examples, at least one predicted trajectory can be determined based at least in part on the heat map. Additionally, output of a machine learning (e.g., trajectory prediction) model based on image data can be used as input into a heatmap generation model as described, for example, in U.S. patent application Ser. No. 15/807,521, filed Dec. 11, 2017, entitled "Probabilistic Heatmaps for Agent Prediction", which is herein incorporated by reference in its entirety.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context. Additionally, the techniques described herein can be used with real data (e.g., captured using sensor(s)), simulated data (e.g., generated by a simulator), or any combination of the two.

FIGS. 1-5 provide additional details associated with example techniques described herein.

FIG. 1 illustrates an example environment 100 that includes a vehicle 102 having a neural network trained to predict object motion based on image data of the object, as described herein. Though depicted as a separate network for illustrative purposes in FIG. 1, it is understood that such a network may form a subnetwork of a larger network trained to output a predicted motion of an object. In some examples, the environment 100 may include one or multiple features, components, and/or functionality of embodiments described herein with reference to FIGS. 2-5.

In some examples, vehicle 102 may be configured to travel across a surface 104 (e.g., a road surface), for example, to transport people and/or cargo from a first location to a second location. For the purpose of illustration, vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assistance during certain driving conditions, such as, for example, while operating on limited-access highways, but such that they require driver attention and/or assistance during other driving conditions, such as, for example, while operating on city streets in urban areas, or during at least some parking functions.

In some examples, vehicle 102 may be an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. Vehicle 102 may be powered by one or more internal combustion engines, one or more electric motors, hydrogen power, or any combination thereof. In addition, although the example vehicle 102 may have four wheels, the systems and methods described herein may be incorporated into vehicles having fewer or a greater number of wheels, tires, and/or tracks. Vehicle 102 may have four-wheel steering and may operate generally with equal performance characteristics in all directions, for example, such that a first end of vehicle 102 may be in the front end of vehicle 102 when traveling in a first direction, and such that the first end may become the rear end of vehicle 102 when traveling in an opposite, second direction. Similarly, a second end of vehicle 102 may be the front end of vehicle 102 when traveling in the second direction, and the second end may become the rear end of vehicle 102 when traveling in the opposite, first direction. These example characteristics may facilitate greater maneuverability, for example, in small spaces or crowded environments, such as parking lots and urban areas.

According to various embodiments, the vehicle 102 may include a sensor system 106. Furthermore, in various examples, vehicle 102 may include a vehicle computing system 108. The vehicle computing system 108 may include one or more components that cause the vehicle computing system 108 and/or the vehicle 102 to perform various operations. In various embodiments, the vehicle computing system 108 may include image data 110 (e.g., real-time data and/or data stored in a memory device of the system), other sensor data 112 (e.g., lidar data, radar data, time-of-flight data, sonar data, location data, internal data, and/or any combination of these), a perception system 114, and a prediction system 116.

Image data 110 may include one or more images, such as image sequence 110A and image sequence 110B, captured over time. Each image in image sequence 110A and image sequence 110B depicts a pedestrian 126 having a particular appearance pose (e.g., shape and/or positioning of body parts). For instance, image sequence 110A depicts the pedestrian 126 walking with arms swinging at sides and legs alternatingly spaced at a moderate stride, whereas each image in image sequence 110B depicts the pedestrian 126 running with arms swinging in front and behind and legs alternating in a long stride. Image data 110 may include such images on which a determination of pose and/or a prediction of speed and/or trajectory of an object (e.g., the person) may be based. As explained in more detail below, image data 110 may be input to the prediction system 116. As discussed above, the prediction system may comprise a machine learned model (e.g., neural network) which has been trained to predict speed and/or trajectory of a pedestrian based on image data. While the examples discussed herein describe prediction of speed and/or trajectory, the techniques and prediction systems described herein may additionally or alternatively be used to estimate current, and/or predict future, characteristics or states of an object, such as velocity, yaw, yaw rate, roll, roll rate, pitch, pitch rate, position, acceleration, or other characteristics. Referring back to the example of FIG. 1, the prediction system 116 may, based at least in part on a pose of a pedestrian depicted in the image, predict a speed and/or trajectory of the pedestrian depicted in the image. Prediction system 116 may use information from perception system 114, such as one or more estimations of speed and/or trajectory, for example, based on single images, as in 120. Additionally or alternatively, once multiple images of the pedestrian have been captured by the sensor system 106, the prediction system 116 may use information from perception system 114, such as one or more refined estimations of speed and/or trajectory, for example, based on multiple images, as in 122. In some examples, accuracy of the estimations 122 may be improved over the estimations 120. In some implementations, vehicle computing system 108 may additionally perform a determination 124 of actual measured speed and/or trajectory based on sensor data from the perception system 114 showing the object moving over time. The sensor data may include sensor data from multiple sensors (e.g., lidar sensors, radar sensors, time of flight sensors, sonar sensors, global positioning system sensors, internal sensors, etc.) of the sensor system 106. In some examples, the determination 124 of actual measured speed and/or trajectory may be obtained by the perception system 114 based on fused or otherwise combined sensor data from multiple modalities of sensors of sensor system 106. The sensor data may be stored in one or more logs, which may include tracks of multiple different objects over time. The sensor data may additionally or alternatively include stored classification data identifying an object type of each object. As described in detail below, such sensor data may be used as a basis for training the model and/or refining output from the model when run on-vehicle.

In some examples, sensor system 106 (e.g., via an image sensor or camera) of vehicle 102 may capture one or more images (e.g., image data 110) of a scene. In a non-limiting example, a camera of sensor system 106 may capture images of a scene that includes one or more objects, such as pedestrian 126. As depicted in FIG. 1, pedestrian 126 is at a first position at a time T and is at a second position at time T+t (e.g., movement during a span of time t after time T). In other words, pedestrian 126 moves during this time span from the first position to the second position. Such movement may, for example, correspond to image sequences 110A and 110B. In some implementations, vehicle computing system 108 may, using image data 110 that includes an image captured by sensor system 106 at time T, determine a pose of the pedestrian at time T and predict a motion (e.g., speed and/or trajectory) of the pedestrian.

According to some embodiments, as explained below, the prediction system 116 may include a machine learned model trained using training data generated based on historical sensor data from one or more perception logs or other sources of historical sensor data. The training data may be generated by associating historical image data 110 based on other historical sensor data indicating the actual measured speed and trajectory of objects depicted in the image data 110. The historical sensor data may include or be based at least in part on historical lidar data, radar data, image data, time of flight data, or combinations of these or other sensor modalities. The historical sensor data may include track data describing the tracks of one or more dynamic objects sensed in the environment of the vehicle. For instance, an image depicting a pedestrian having a particular pose can be labeled with the actual measured speed and/trajectory of the pedestrian at the time the image was captured (e.g., as may be provided by the tracking information, radar returns, or the like associated with the pedestrian in the image) and/or at a time following the time at which the image was captured.

This labeling can be performed for some or all of the images depicting objects to generate training data which can be used to train a neural network or other machine learning model. Based on this training data, the machine learning model may be trained to detect and/or predict motion (e.g., speed and/or trajectory) of persons based on their pose as captured in an image (e.g., image data 110).

In some embodiments, sensor system 106 may include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. Sensor system 106 can generate sensor data, which can be utilized by vehicle computing system 108 associated with vehicle 102.

Figure 2:
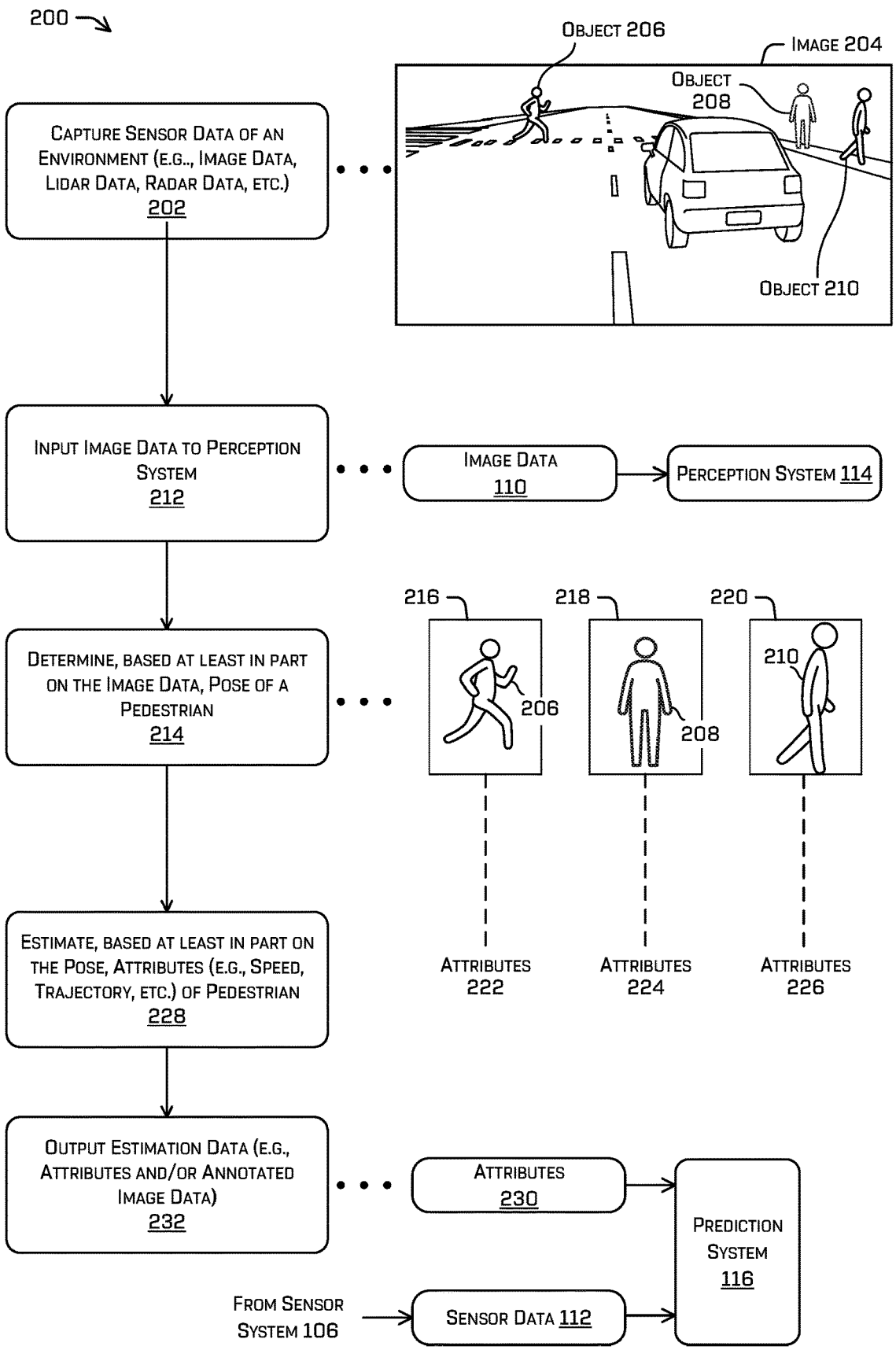
FIG. 2 is a pictorial flow diagram illustrating an example process of determining pose information and/or trajectory information of an object(s).

FIG. 2 is a pictorial flow diagram illustrating an example process 200 of determining pose information and predicting speed and/or trajectory information of an object(s). The process is described as being performed by vehicle computing system 108 of vehicle 102 of FIG. 1, for example, though claimed subject matter is not so limited and may be performed by other systems and/or devices. At 202, vehicle computing system 108 may receive sensor data 112 of an environment captured by sensor system 106. For example, sensor data 112 may include image data, lidar data, radar data, time of flight data, and so on. The environment may include a number of objects for which the sensor data 112 includes measurements. In the particular example of process 200, image data comprises an image frame 204 that includes an image of an object 206 that is a person walking across a street on which the vehicle is operating. An object 208 may be another person standing on the side of the street. An object 210 may be yet another person walking along the side of the street.

In some examples, at 212, vehicle computing system 108 may input the image data to a perception system. For example, image data 110 may be provided to perception system 114, described above with reference to FIG. 1. At 214, vehicle computing system 108 may determine, based at least in part on the image data, pose of one or more object(s) (e.g., illustrated as a pedestrian(s) in FIG. 2) represented in the image data 110. As discussed above, the pose may include geometric pose (e.g., position and orientation as described in SE(3) coordinates, for example) as well as appearance pose (e.g., shape and/or positioning of body parts). In the illustrated example, the image data 110 includes an image 216 of object 206, an image 218 of object 208, and an image 220 of object 210. The prediction system 116 may determine a pose for each of objects 206, 208, and 210.

At 228, the prediction system 116 may predict a speed and/or trajectory of the objects 206, 208, and 210 based on the pose. In some examples, an output of the prediction system 116 may include magnitude of velocity (i.e., speed) and an angle of travel of the object. In some examples, the prediction system 116 may be trained to output attributes, including pose, speed, trajectory, and/or other characteristics for a current state and/or one or more future states based on sensor data input. In some examples, the prediction system 116 may additionally be configured to output attributes including an uncertainty or confidence of the current and/or predicted future pose, speed and/or trajectory. In the illustrated example, the prediction system 116 associates attributes 222 with object 206 in image 216, associates attributes 224 with object 208 in image 218, and associates attributes 226 with object 210 in image 220. As discussed above, the attributes 222, 224, and 226 may include current and/or future predictions of pose, speed, trajectory, velocity, yaw, yaw rate, roll, roll rate, pitch, pitch rate, position, acceleration, confidence or uncertainty of any of the foregoing, or other characteristics (e.g., corresponding to one or more time steps in the future). Further, though 214 and 228 are depicted as two distinct operations for illustrative purposes, the figure is not meant to be so limiting. As a non-limiting example, image data 110 may be input directly into a prediction system (e.g., prediction system 118) and one or more of a pose, velocity, or other attributes for each object detected therein may be output directly from such a model without the need for an intermediate step of determining pose.

In some examples, one or more predetermined sub-classifications of pose may be established corresponding to bins or ranges of velocity (e.g., standing, walking, running, etc.). In that case, the prediction system 116 may determine which of the predetermined sub-classifications applies and may assign a confidence or likelihood to the sub-classifications for each object. For instance, the prediction system 116 may assign a relatively high confidence that the pedestrian 206 depicted in image 216 is running, a relatively lower confidence that the pedestrian 206 is walking, and a still lower confidence that the pedestrian 206 is standing still. The prediction system 116 may assign a relatively high confidence that the pedestrian 208 depicted in image 220 is standing still, a relatively lower confidence that the pedestrian 208 is walking, and a still lower confidence that the pedestrian 208 is running. The prediction system 116 may assign a relatively high confidence that the pedestrian 210 depicted in image 224 is waling, a relatively lower confidence that the pedestrian 208 is standing still or running. Such output may be, for example, output by a softmax layer in a prediction system in which the prediction system comprises a neural network.

At 232, the attributes 230 may be provided as an input to the prediction system 116 along with sensor data 112 from the sensor system 106. The attributes 230 may comprise the attributes 222, 224, and/or 226, which may, in some examples, be associated with the corresponding image data to generate annotated image data. Such a prediction system may, in turn, use such attributes to inform a planner of an autonomous vehicle (as described in detail below).

In some implementations, vehicle computing system 108 may detect jitter or uncertainty of sensor data by comparing a pose or predicted trajectory of an object (e.g., a pedestrian) from the prediction system 116 with sensor data associated with the object. Jitter, for example, may arise as an apparent motion of the object included in two sequential images or other sensor data due to sensor measurement error. Apparent motion in the sensor data may be attributable to actual motion of the object and/or to jitter. The output of the prediction system (e.g., pose, predicted speed, predicted trajectory, etc.) may allow vehicle computing system 108 to disambiguate between jitter and true motion of the object. For instance, noise in the perception system may not provide the ability to reliably determine object speed above some noise floor and such noise may impact the ability to navigate around the object. However, the output of the prediction system 116 may indicate that apparent motion of an object indicated by sensor data is attributable to actual motion of the object if the prediction data indicate a motion state of the object (e.g., walking or running), a non-zero speed, and/or a trajectory that matches the apparent motion indicated by the sensor data. On the other hand, the output of the prediction system 116 may indicate that the apparent motion of the object indicated by the sensor data is attributable to jitter or measurement error if the prediction data indicate a non-motion state of the object (e.g., standing still), a zero speed, and/or a trajectory that contradicts the apparent motion indicated by the sensor data. In addition to detecting jitter (e.g., via disambiguation), in some examples, the vehicle computing system 108 may mitigate or compensate for jitter by, for example, adjusting confidence levels associated with perception outputs based on the pose of the object (e.g., person). For instance, if the perception system 114 of the vehicle indicates based on sensor data (e.g., image data, lidar data, etc.) that a pedestrian has changed position, but the output of the prediction system 116 indicates with a high confidence that a pose of a pedestrian corresponds to a standing state and/or predicts a speed of zero, the vehicle computing system 108 may determine that the sensor data includes jitter or measurement error and may down-weight a confidence that the pedestrian has actually moved.

Figure 3:
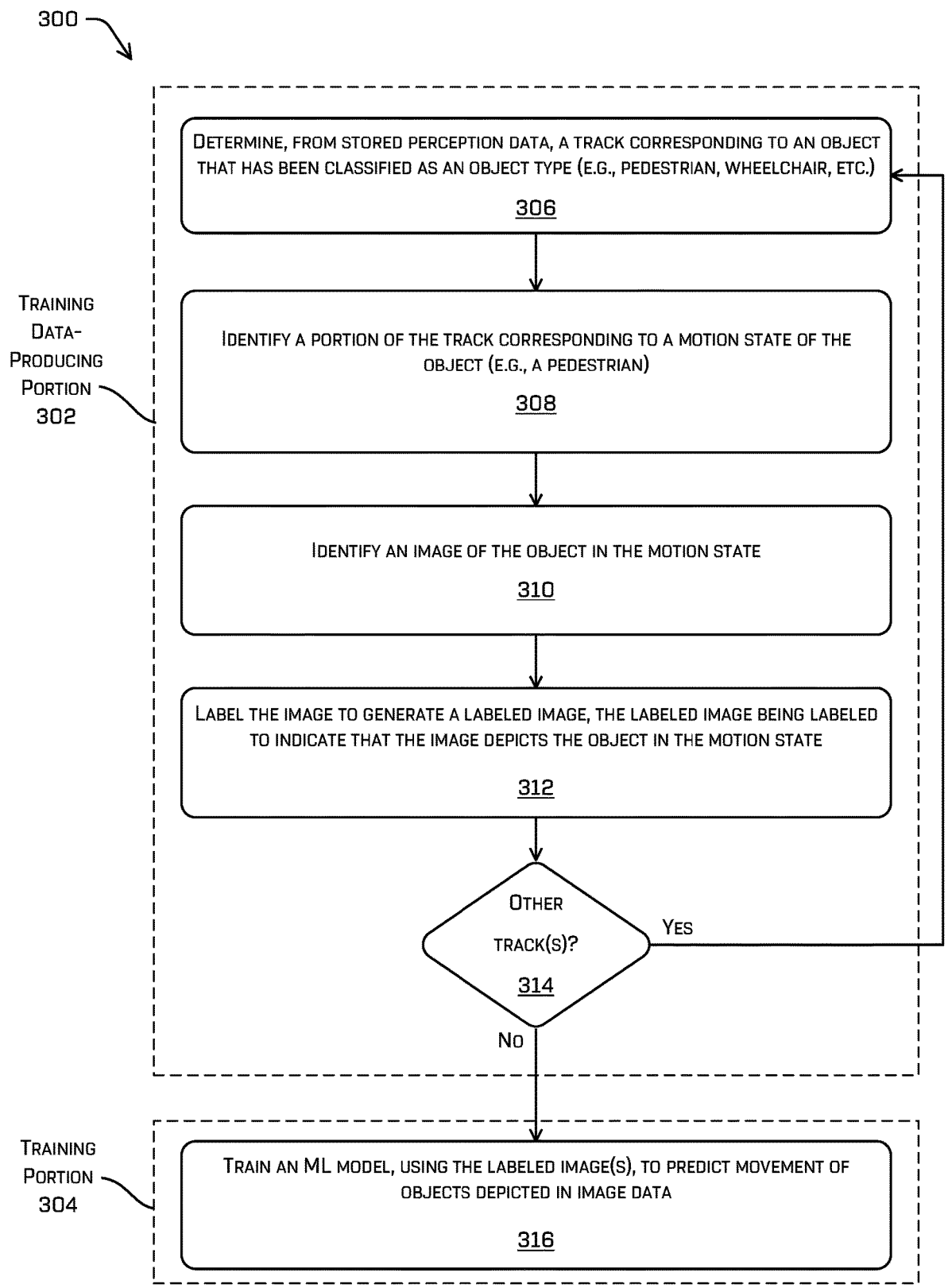
FIG. 3 is a flow diagram illustrating an example process for producing and using a labelled image to train a machine learning model, as described herein.

FIG. 3 is a flow diagram illustrating an example process 300 for producing and using a labelled image to train a machine learning model, according to some embodiments. Process 300 may be divided into a (training) data-producing portion 302 and a training portion 304. For example, data-producing portion 302 may include generating training data for subsequent use by a machine learning model and training portion 304 may include providing the training data to the machine learning model to train the model to predict a trajectory of an object based on a pose or other state of the object in an image. Data-producing portion 302 may generate relatively large batches of pre-recorded training data substantially automatically, without manual labeling. In some implementations, data-producing portion 302 and training portion 304 may be performed offline by a computing device, such as computing device 540, while a subsequent prediction process performed by the trained machine learned model may operate on a computing system on board a vehicle. In other implementations, any combination of data-producing portion 302 and/or training portion 304 may be performed by a computing system of a network and/or by a computing system on board a vehicle (e.g., during charging or periods of low utilization).

At 306, a computing system may determine or otherwise receive, from stored perception data (e.g., historical or pre-recorded data), a track corresponding to an object that has been classified as an object type. For example, the stored perception data may comprise data obtained from a computing system of a vehicle (e.g., computing system 108 and/or a computing system of a network), which captured and stored the sensor data or track data during operation. The stored perception data may, in some examples, include fused perception data captured by the vehicle. Fused perception data may include a fusion or other combination of sensor data from multiple sensor systems on a vehicle, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include a track data (positions, orientations, sensor features, etc.) corresponding to motion of objects classified as dynamic objects through the environment. The track data may include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

At 308, the computing system may identify a portion of the track corresponding to a motion state of the object (e.g., a pedestrian). For example, the computing device may identify a portion of the track that may correspond to movement (e.g., position and/or orientation change) of the object. At 310, the computing system may identify an image of the object (e.g., pedestrian) in motion. For example, the image may have been captured by a camera that is part of sensor system 106 of vehicle 102. The image may comprise all or a portion (e.g., a cropped region) of an image frame captured by the camera or other image capture device.

At 312, the computing system may label (or otherwise associate) the image to generate a labeled image, the labeled image being labeled to indicate that the image depicts the object in the motion state. Such a label may include one or more measured parameters or characteristics of the object in the image. For example, the computing system may determine, based on the perception data, whether the object in the image was in fact in motion when the image was captured. If so, then the computing system may label, or otherwise associate, the image to indicate a motion state of the object (e.g., walking, running, standing still, etc.), speed, trajectory, and/or any other characteristics of the object at the time the image was captured and/or at one or more times subsequent to the time the image was captured. In this way, training data may be generated relatively easily and cheaply, in terms of human and computing effort. Such training data may be used to train a machine learning model to detect images that correspond to motion states of an object (e.g., pedestrian, animal, etc.) and/or a speed associated with a particular pose in an image frame. The operations 308, 310, and 312 may be repeated for some or all of portions of the track and/or some or all motion states of the object.

At 314, the computing system may determine whether one or more other tracks are to be determined for other objects (e.g., other pedestrians) and/or other object types (e.g., objects other than pedestrians). If so, then process 300 returns to 306 to repeat the portion of process 300 that includes 306, 308, 310, and 312 based on the one or more other tracks. If not, then process 300 proceeds to 316 where the computing system may train an ML model, using the labeled image(s), to predict current or future speed, trajectory, and/or any other characteristics of objects depicted in image data. Of course, though illustrated in FIG. 3 as being performed serially for each object for illustrative purposes, the figure is not meant to be so limiting. In at least some examples, all objects represented in an image (or batch of images) may be processed according to the steps herein substantially simultaneously (e.g., by performing such steps using parallel processing on a General Purpose Graphics Processing Unit, GPGPU).

Figure 4:
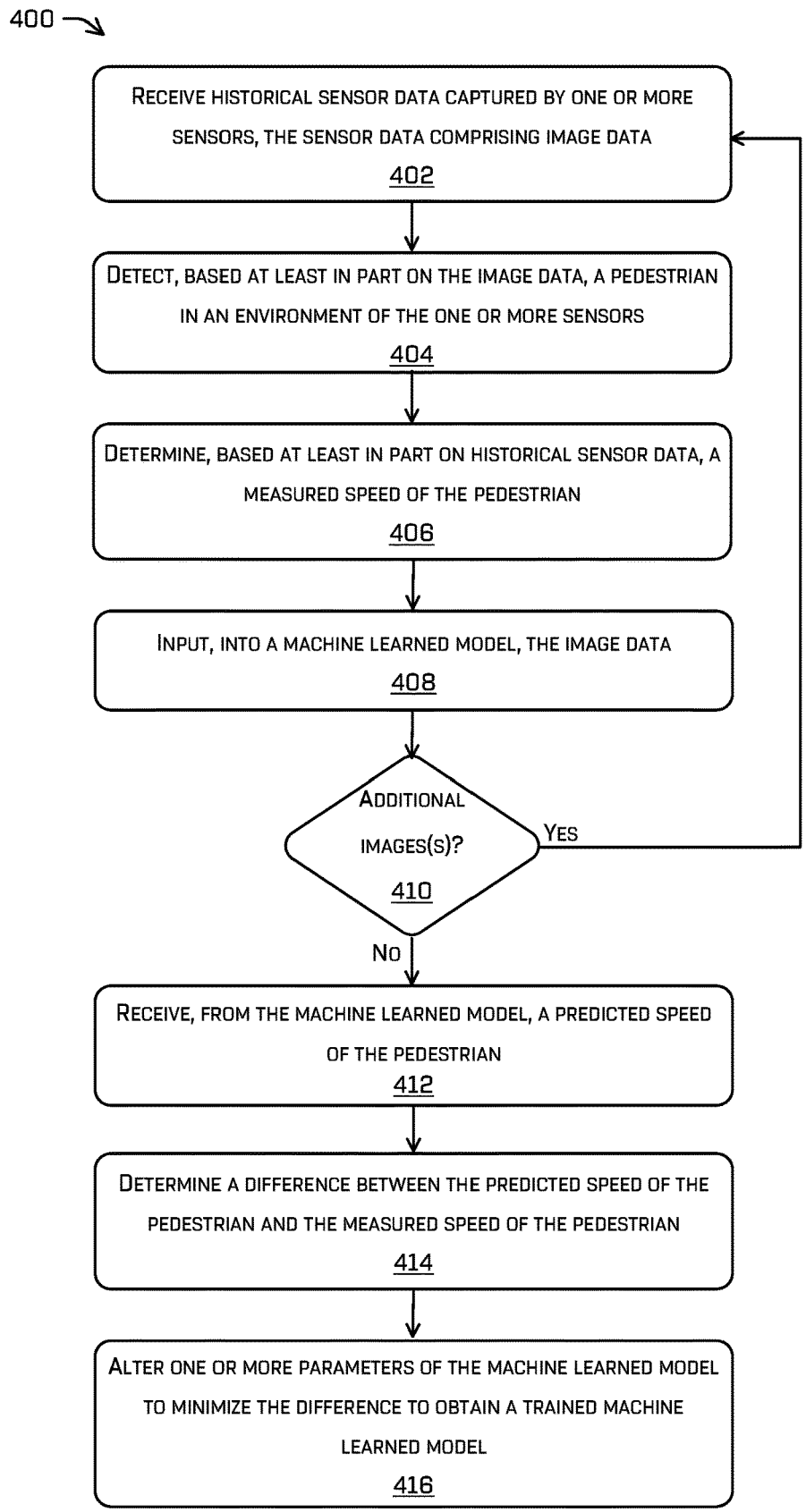
FIG. 4 is a flow diagram illustrating an example process for modifying a machine learned model based on a difference between a predicted speed of a pedestrian and a measured speed of the pedestrian, as described herein.

FIG. 4 is a flow diagram illustrating an example process 400 for modifying a machine learned model based on a difference between a predicted speed of a pedestrian and a measured speed of the pedestrian, as described herein. In some examples, process 400 may include one or multiple features, components, and/or functionality of embodiments described herein with reference to FIGS. 1-3 and 5. For instance, process 400 may be performed offline by a computing device, such as computing device 540 described below, or vehicle computing system 108. In other implementations, all or a portion of the process 400 may be performed by a computing system on board a vehicle, such as computing system 108 (e.g., during charging or periods of low utilization).

At 402, a computing system may receive historical sensor data captured by one or more sensors, the sensor data comprising image data. In at least some examples, such sensor data may be historical sensor data which was previously captured by one or more sensors. For example, the historical sensor data may comprise image data, such as image data 110 illustrated in FIG. 1, that was previously captured by a vehicle during operation and stored as perception data in one or more data stores of the vehicle or another computing device (e.g., computing device 540). At 404, the computing system may detect, based at least in part on the image data, a pedestrian in an environment of the one or more sensors. At 406, the computing system may determine, based at least in part on historical sensor data, a measured speed of the pedestrian at a time that the image data was captured and/or at one or more times after the image data was captured. In at least some examples, such measured speed may be provided in track information associated with the object as previously determined using data association techniques. Additionally, or alternatively, some sensor modalities may provide such velocity information (such as radar returns) or may otherwise be determined based at least in part on subsequent times steps of such data. In some examples, the computing system may additionally or alternatively determine, based at least in part on historical sensor data, one or more other measured characteristics of the pedestrian (e.g., trajectory, velocity, yaw, yaw rate, roll, roll rate, pitch, pitch rate, position, acceleration, etc.) at a time that the image data was captured and/or at one or more times after the image data was captured. In at least some examples, these additional attributes may have been previously computed (e.g., by one or more systems on the vehicle) and associated with the object track. In at least one or more examples, such an object track may also comprise an appearance pose (e.g., in addition to a geometric pose) as may be (or have been) determined by another machine learned model or otherwise labeled. Such measured, or otherwise determined values, may generally referred to as "ground truth" data.

At 408, the computing system may input, into a machine learned model, the image data. At 410, the computing system may determine whether there is/are additional image(s). If so, then process 400 may return to 402 to obtain additional images to input to the machine learned model. If not, then process 400 proceeds to 412, where the computing system may receive, from the machine learned model, a predicted speed of the pedestrian. Of course, such a depiction is not meant to be so limiting. In at least some examples, batches of sensor data and/or associated track (or attribute) information may be provided to such a machine learned model substantially simultaneously (e.g., in parallel). In some examples, the machine learned model may additionally or alternatively output predictions of one or more other characteristics of the pedestrian (e.g., trajectory, velocity, yaw, yaw rate, roll, roll rate, pitch, pitch rate, position, acceleration, appearance pose, etc.). At 414, the computing system may determine a difference between the predicted speed (and any other predicted characteristics) of the pedestrian and the measured speed (and any other measured characteristics)—the "ground truth"—of the pedestrian. At 416, the computing system may alter one or more parameters of the machine learned model to minimize the difference to obtain a trained machine learned model. By altering the one or more parameters of the machine learned model to minimize the difference the machine learned model "learns" over time to accurately predict the speed, trajectory, and/or other characteristics of objects such as pedestrians based on images (e.g., a single image or multiple images) depicting the object.

Figure 5:
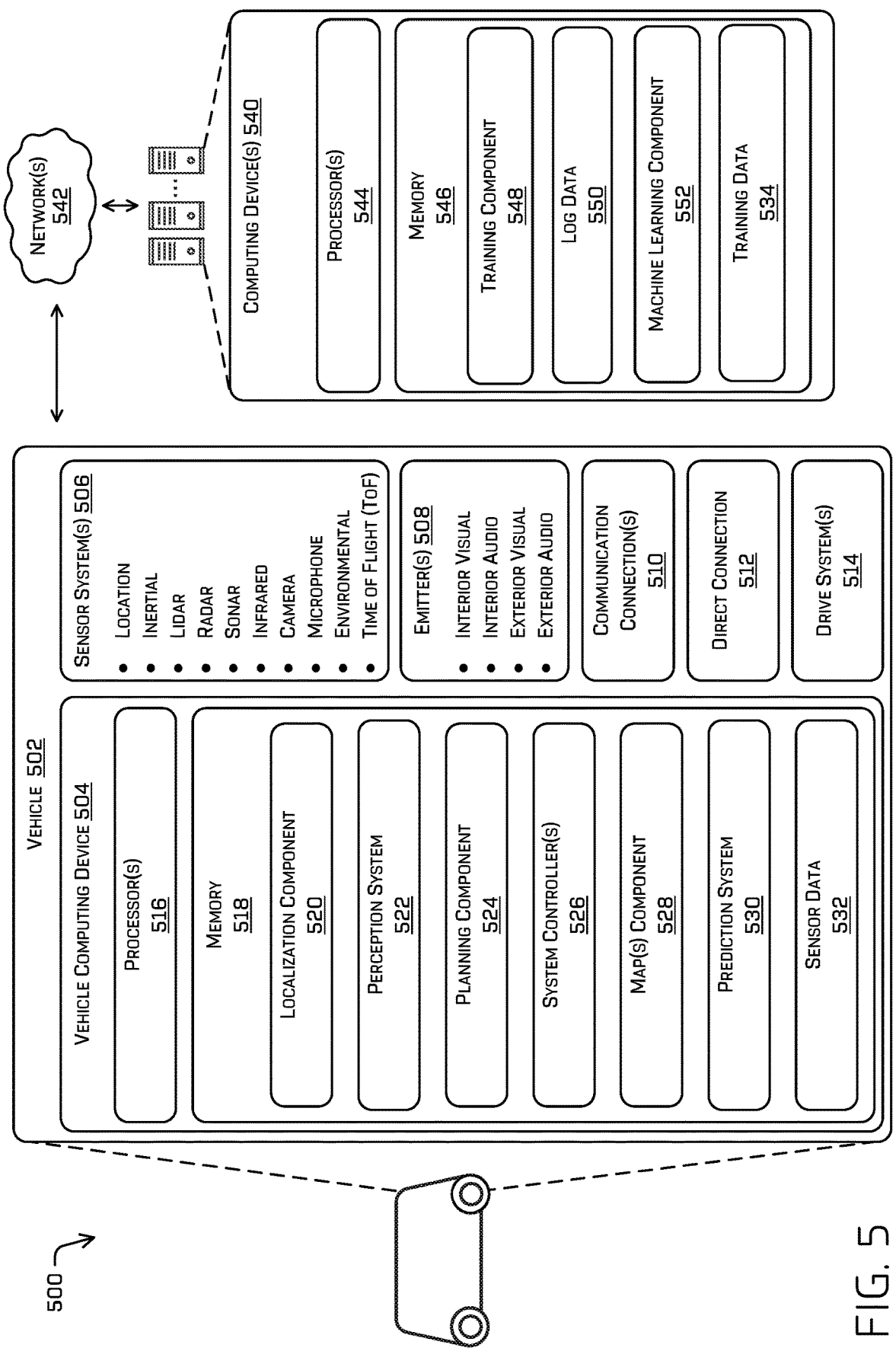
FIG. 5 is a block diagram of an example system for implementing the techniques described herein.

FIG. 5 is a block diagram of an example system 500 for implementing the techniques described herein, in accordance with embodiments of the disclosure. In some examples, the system 500 may include one or multiple features, components, and/or functionality of embodiments described herein with reference to FIGS. 1-4.

In some embodiments, the system 500 may include a vehicle 502 (e.g., the vehicle 102 described herein with reference to FIG. 1). The vehicle 502 may include a vehicle computing device 504, one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle, or any other system having components such as those illustrated in FIG. 5 (e.g., a robotic system, a camera enabled smartphone, etc.). In the illustrated example, the memory 518 of the vehicle computing device 504 stores a localization component 520, a perception system 522 (e.g., perception system 114), a planning component 524, one or more system controllers 526, a map(s) component 528, prediction system 530 (e.g., prediction system 116), and/or sensor data 532 (e.g., sensor data 112). Though depicted in FIG. 5 as residing in memory 518 for illustrative purposes, it is contemplated that localization component 520, perception system 522, planning component 524, one or more system controllers 526, prediction system 530, and/or sensor data 532, can additionally, or alternatively, be accessible to the vehicle 502 (e.g., stored on, or otherwise accessible by, memory remote from the vehicle 502). In some instances, the vehicle computing device(s) 504 can correspond to the vehicle computing system 108 of FIG. 1.

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for determining to retrieve map data including an occlusion grid from memory, as discussed herein.

In some instances, the perception system 522 can include functionality to perform object tracking, detection, segmentation, and/or classification (e.g., based on the techniques discussed herein). In some examples, the perception system 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception system 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment. For example, the planning component 524 can determine various routes and trajectories and various levels of detail. For example, the planning component 524 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 524 can generate an instruction for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include the map(s) component 528 to maintain and/or update one or more maps (not shown) that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 502 can be controlled based at least in part on the maps. That is, the maps can be used in connection with the localization component 520, the perception system 522, and/or the planning component 524 to determine a location of the vehicle 502, identify objects in an environment, and/or generate routes and/or trajectories to navigate within an environment.

In some examples, the one or more maps can be stored on a remote computing device(s) (such as the computing device(s) 540) accessible via network(s) 542. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The prediction system 530 is configured to estimate current, and/or predict future, characteristics or states of an object (e.g., a pedestrian, animal, etc.), such as pose, speed, trajectory, velocity, yaw, yaw rate, roll, roll rate, pitch, pitch rate, position, acceleration, or other characteristics, based on one or more images of the object. For instance, the prediction system 530 may receive image data from sensor data 532 captured by a camera or other image sensor of sensor system(s) 506, and predict one or more of the foregoing characteristics of the object. The prediction can be made based on a single images or multiple images (e.g., multiple sequential image frames) depicting the object.

In some instances, aspects of some or all of the components discussed herein can include any models, algorithms, and/or machine learning algorithms. For example, in some instances, components in the memory 518 (and the memory 546, discussed below) such as the perception system 522, planning component 524, and prediction system 530 can be implemented as a neural network. For instance, the prediction system 530 may comprise a machine learned model (e.g., neural network) which has been trained to predict speed, trajectory, and/or other characteristics of a pedestrian (or other object) based on image data.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatter-plot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), an one or more time of flight (ToF) sensors, etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 542, to the one or more computing device(s) at a particular frequency, after a lapse of a predetermined period of time, in near real-time, etc. In some instances, the sensor system(s) 506 can correspond to the sensor system(s) 106 of FIG. 1.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device (e.g., computing device(s) 540) and/or a network, such as network(s) 542. For example, the communications connection(s) 510 can enable Wi-Fi-based communication such as via frequencies defined by the IEEE 702.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In at least one example, the components discussed herein can process sensor data, as described above, and can send their respective outputs, over the one or more network(s) 542, to one or more computing device(s) 540. In at least one example, the components discussed herein can send their respective outputs to the one or more computing device(s) 540 at a particular frequency, after a lapse of a predetermined period of time, in near real-time, etc.

In some examples, the vehicle 502 can send sensor data to one or more computing device(s) 540 via the network(s) 542. In some examples, the vehicle 502 can send raw sensor data to the computing device(s) 540. In other examples, the vehicle 502 can send processed sensor data and/or representations of sensor data to the computing device(s) 540. In some examples, the vehicle 502 can send sensor data to the computing device(s) 540 at a particular frequency, after a lapse of a predetermined period of time, in near real-time, etc. In some cases, the vehicle 502 can send sensor data (raw or processed) to the computing device(s) 540 as one or more log files.

The computing device(s) 540 can include processor(s) 544 and memory 546 storing a training component 548, log data 550, a machine learning component 552, and/or training data 534. The log data 550 may include historical or pre-recorded sensor data obtained from a computing system of a vehicle (e.g., computing system 108, computing device 502, etc.), which captured and stored the sensor data during operation. The log data 550 may include raw sensor data or processed sensor data. The log data 550 may, in some examples, include fused perception data captured by multiple sensor systems on a vehicle, such as image sensors, lidar sensors, radar sensors, time of flight sensors, sonar sensors, global positioning system sensors, internal sensors, and/or any combination of these. The log data 550 may additionally or alternatively include classification data including semantic classifications of objects (e.g., pedestrians, vehicles, buildings, road surfaces, etc.) represented in the sensor data and/or track data corresponding to motion of objects classified as dynamic objects through the environment. The track data may include multiple tracks of multiple different objects over time.

The training component 548 can generate the training data 534 using the log data 550. For instance, the training component 548 can label images of an object with one or more measured parameters or characteristics of the object in the image. The images and/or the measured parameters or characteristics may be obtained from the log data 550. The label may include an indication of a motion state of the object (e.g., walking, running, standing still, etc.), speed, trajectory, pose, and/or any other characteristics of the object at the time the image was captured and/or at one or more times subsequent to the time the image was captured. The training component 548 can then use the training data 534 and use it to train the machine learning component 552 to predict motion states of predict current or future speed, trajectory, and/or any other characteristics of objects based on pose of the object depicted in image data.

The processor(s) 516 of the vehicle 502 and the processor(s) 544 of the computing device(s) 540 can be any suitable processor capable of executing instructions to process data and perform operations as described herein. By way of example and not limitation, the processor(s) 516 and 544 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 5 is illustrated as a distributed system, in alternative examples, components of the vehicle 502 can be associated with the computing device(s) 540 and/or components of the computing device(s) 540 can be associated with the vehicle 502. That is, the vehicle 502 can perform one or more of the functions associated with the computing device(s) 540, and vice versa. Further, aspects of machine learning component 552 can be performed on any of the devices discussed herein.

EXAMPLE CLAUSES

A. A system comprising: one or more processors; and on-transitory computer-readable media storing instructions that when executed by the one or more processors, cause the system to perform operations comprising: receiving first sensor data captured by one or more sensors of an autonomous vehicle at a first time, the first sensor data comprising first image data; detecting, based at least in part on the first image data, a pedestrian having a pose in an environment of the autonomous vehicle; determining, based at least in part on one or more of the first sensor data or second sensor data captured by the one or more sensors at a second time comprising a second image associated with a representation of the pedestrian, a measured speed of the pedestrian;

inputting, into a machine learned model, the first image data; receiving, from the machine learned model, a predicted speed of the pedestrian; determining a difference between the predicted speed of the pedestrian and the measured speed of the pedestrian; and altering one or more parameters of the machine learned model to minimize the difference to obtain a trained machine learned model.

B. The system of paragraph A, the operations further comprising: receiving additional sensor data captured by one or more sensors of the autonomous vehicle, the additional sensor data comprising additional image data depicting a second pedestrian; inputting, into the trained machine learned model, the additional image data; receiving, from the trained machine learned model and based at least in part on the additional image data, a predicted speed of the second pedestrian; and controlling the autonomous vehicle based at least in part on the predicted speed of the second pedestrian.

C. The system of paragraph A, the operations further comprising: receiving, from the machine learned model and based at least in part on the pose of the pedestrian, a predicted trajectory of the pedestrian; determining, based at least in part on the first sensor data and the second sensor data, a measured trajectory of the pedestrian from the first time to the second time; determining a difference between the predicted trajectory of the pedestrian and the measured trajectory of the pedestrian; and altering one or more parameters of the machine learned model to minimize the difference to obtain the trained machine learned model.

D. The system of paragraph C, the operations further comprising: receiving third sensor data captured by one or more sensors of the autonomous vehicle, the third sensor data comprising third image data associated with a second pedestrian; inputting, into the trained machine learned model, the third image data; receiving, from the trained machine learned model and based at least in part on the third image data, a predicted trajectory of the second pedestrian; and controlling the autonomous vehicle based at least in part on the predicted trajectory of the second pedestrian.

E. The system of paragraph A, wherein receiving the first sensor data comprises receiving the first sensor data from a data store of historical sensor data, the operations further comprising:
receiving historical tracking data associated with the pedestrian and indicative of one or more of a speed, trajectory, or position of the pedestrian.

F. The system of paragraph A, the operations further comprising: receiving additional sensor data captured by one or more sensors of the autonomous vehicle, the additional sensor data comprising: additional image data associated with a second pedestrian; and one or more of lidar data or radar data indicating measured movement of the second pedestrian; detecting, based at least in part on the additional image data, a pose of the second pedestrian in the environment of the autonomous vehicle; and determining, based at least in part on the pose of the second pedestrian, that the measured movement of the second pedestrian indicated by the one or more of the lidar data or the radar data is at least partially due to measurement error of the lidar data or radar data.

G. A method comprising: receiving first sensor data captured by one or more sensors at a first time, the first sensor data comprising first image data; detecting, based at least in part on the first image data, an object in an environment of the one or more sensors; determining, based at least in part on the first sensor data, a measured speed of the object at the first time; inputting, into a machine learned model, the first image data; receiving, from the machine learned model, a predicted speed of the object; determining a difference between the predicted speed of the object and the measured speed of the object; and altering one or more parameters of the machine learned model to minimize the difference to obtain a trained machine learned model.

H. The method of paragraph G, wherein the first sensor data comprises at least one of historical lidar data, historical radar data, or historical track log data, wherein the historical track log data is associated with the object and indicative of one or more speeds, yaw angles, poses, extents, or accelerations of the object.

I. The method of paragraph G, further comprising: receiving second sensor data captured by the one or more sensors, the second sensor data comprising second image data depicting a second object; inputting, into the trained machine learned model, the second image data; receiving, from the trained machine learned model and based at least in part on the second image data, a predicted speed of the second object; and controlling the autonomous vehicle based at least in part on the predicted speed of the second object.

J. The method of paragraph G, further comprising: receiving, from the machine learned model and based at least in part on a pose of the object, a predicted trajectory of the object; receiving second sensor data associated with the object in the environment at a second time; determining, based at least in part on the first sensor data and the second sensor data, a measured trajectory of the object from the first time to the second time; determining a difference between the predicted trajectory of the object and the measured trajectory of the object; and altering one or more parameters of the machine learned model to minimize the difference to obtain the trained machine learned model.

K. The method of paragraph J, further comprising: receiving third sensor data captured by the one or more sensors, the third sensor data comprising third image data associated with a second object; inputting, into the trained machine learned model, the third image data; receiving, from the trained machine learned model and based at least in part on the third image data, a predicted trajectory of the second object; and controlling the autonomous vehicle based at least in part on the predicted trajectory of the second object.

L. The method of paragraph G, wherein the object comprises a pedestrian.

M. The method of paragraph G, further comprising: receiving second sensor data captured by the one or more sensors, the second sensor data comprising: second image data associated with a second object; and one or more of lidar data or radar data indicating associated with the second object; determining, based at least in part on the one or more of lidar data or radar data, a measured movement of the second object; detecting, based at least in part on the second image data, a pose of the second object in the environment of the one or more sensors; and determining, based at least in part on the pose of the second object, that the measured movement of the second object indicated by the one or more of the lidar data or the radar data is at least partially due to measurement error of the lidar data or radar data.

N. A non-transitory computer-readable medium storing instructions that, when executed, cause one or more processors to perform operations comprising: receiving first sensor data captured by one or more sensors at a first time, the first sensor data comprising first image data; detecting, based at least in part on the first image data, an object having a pose in an environment of the one or more sensors; determining a measured speed of the object at the first time; inputting, into a machine learned model, the first image data; receiving, from the machine learned model, a predicted speed of the object; determining a difference between the predicted speed of the object and the measured speed of the object; and altering one or more parameters of the machine learned model to minimize the difference to obtain a trained machine learned model.

O. The non-transitory computer-readable medium of paragraph N, wherein the first sensor data comprises at least one of historical lidar data, historical radar data, or historical track log data, and wherein the historical track log data is indicative of one or more of positions, speeds, velocities, accelerations, extents, or poses of the object over a period of time.

P. The non-transitory computer-readable medium of paragraph N, the operations further comprising: receiving second sensor data captured by the one or more sensors, the second sensor data comprising second image data depicting a second object; inputting, into the trained machine learned model, the second image data; receiving, from the trained machine learned model and based at least in part on the second image data, one or more of a predicted speed of the second object or a predicted heading of the second object; and controlling the autonomous vehicle based at least in part on the predicted speed of the second object.

Q. The non-transitory computer-readable medium of paragraph N, the operations further comprising: detecting, based at least in part on the first image data, the pose of the object in the environment of the one or more sensors; receiving, from the machine learned model and based at least in part on the pose of the object, a predicted trajectory of the object; receiving second sensor data associated with the object in the environment at a second time; determining, based at least in part on the first sensor data and the second sensor data, a measured trajectory of the object from the first time to the second time; determining a difference between the predicted trajectory of the object and the measured trajectory of the object; and altering one or more parameters of the machine learned model to minimize the difference to obtain the trained machine learned model.

R. The non-transitory computer-readable medium of paragraph Q, the operations further comprising: receiving third sensor data captured by the one or more sensors, the third sensor data comprising third image data associated with a second object; inputting, into the trained machine learned model, the third image data; receiving, from the trained machine learned model and based at least in part on the third image data, a predicted trajectory of the second object; and controlling the autonomous vehicle based at least in part on the predicted trajectory of the second object.

S. The non-transitory computer-readable medium of paragraph N, wherein the pose is indicative of one or more of a position of the object, an orientation of the object, or relative appendage positions of the object.

T. The non-transitory computer-readable medium of paragraph N, the operations further comprising: receiving second sensor data captured by the one or more sensors, the second sensor data comprising: second image data associated with a second object; and one or more of lidar data or radar data associated with the second object; determining, based at least in part on one or more of the first sensor data or second sensor data, a measured movement of the object; detecting, based at least in part on the second image data, a pose of the second object in the environment of the one or more sensors; and determining, based at least in part on the pose of the second object, that the measured movement of the second object indicated by the one or more of the lidar data or the radar data is at least partially due to measurement error of the lidar data or radar data.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system for training a machine learned model to detect object speed, the system comprising:
  one or more processors; and
  one or more non-transitory computer-readable media storing instructions that when executed by the one or more processors, cause the system to perform operations comprising:
    receiving first sensor data captured by one or more sensors of an autonomous vehicle at a first time, the first sensor data comprising first image data;
    detecting, based at least in part on the first image data, a pedestrian having a pose in an environment of the autonomous vehicle;
    determining, based at least in part on one or more of the first sensor data or second sensor data captured by the one or more sensors at a second time comprising a second image associated with a representation of the pedestrian, a measured speed of the pedestrian;
    inputting, into a machine learned model, the first image data;
    receiving, from the machine learned model, a predicted speed of the pedestrian that is based on the first image data independent of sensor data from other sensor modalities;
    determining a difference between the predicted speed of the pedestrian and the measured speed of the pedestrian; and
    altering one or more parameters of the machine learned model to minimize the difference to obtain a trained machine learned model to detect object speed.

2. The system of claim 1, the operations further comprising:
  receiving additional sensor data captured by one or more sensors of the autonomous vehicle, the additional sensor data comprising additional image data depicting a second pedestrian;
  inputting, into the trained machine learned model, the additional image data;
  receiving, from the trained machine learned model and based at least in part on the additional image data, a predicted speed of the second pedestrian; and controlling the autonomous vehicle based at least in part on the predicted speed of the second pedestrian.

3. The system of claim 1, the operations further comprising:
receiving, from the machine learned model and based at least in part on the pose of the pedestrian, a predicted trajectory of the pedestrian;
determining, based at least in part on the first sensor data and the second sensor data, a measured trajectory of the pedestrian from the first time to the second time;
determining a difference between the predicted trajectory of the pedestrian and the measured trajectory of the pedestrian; and
altering one or more parameters of the machine learned model to minimize the difference to obtain the trained machine learned model.

4. The system of claim 3, the operations further comprising:
receiving third sensor data captured by one or more sensors of the autonomous vehicle, the third sensor data comprising third image data associated with a second pedestrian;
inputting, into the trained machine learned model, the third image data;
receiving, from the trained machine learned model and based at least in part on the third image data, a predicted trajectory of the second pedestrian; and
controlling the autonomous vehicle based at least in part on the predicted trajectory of the second pedestrian.

5. The system of claim 1, wherein receiving the first sensor data comprises receiving the first sensor data from a data store of historical sensor data,
the operations further comprising:
receiving historical tracking data associated with the pedestrian and indicative of one or more of a speed, trajectory, or position of the pedestrian.

6. The system of claim 1, the operations further comprising:
receiving additional sensor data captured by one or more sensors of the autonomous vehicle, the additional sensor data comprising:
additional image data associated with a second pedestrian; and
one or more of lidar data or radar data indicating measured movement of the second pedestrian;
detecting, based at least in part on the additional image data, a pose of the second pedestrian in the environment of the autonomous vehicle; and
determining, based at least in part on the pose of the second pedestrian, that the measured movement of the second pedestrian indicated by the one or more of the lidar data or the radar data is at least partially due to measurement error of the lidar data or radar data.

7. A method for training a machine learned model to detect object speed, the method comprising:
receiving first sensor data captured by one or more sensors at a first time, the first sensor data comprising first image data;
detecting, based at least in part on the first image data, an object in an environment of the one or more sensors;
determining, based at least in part on the first sensor data, a measured speed of the object at the first time;
inputting, into a machine learned model, the first image data;
receiving, from the machine learned model, a predicted speed of the object that is based on the first image data independent of sensor data from other sensor modalities;
determining a difference between the predicted speed of the object and the measured speed of the object; and
altering one or more parameters of the machine learned model to minimize the difference to obtain a trained machine learned model to detect object speed.

8. The method of claim 7, wherein the first sensor data comprises at least one of historical lidar data, historical radar data, or historical track log data,
wherein the historical track log data is associated with the object and indicative of one or more speeds, yaw angles, poses, extents, or accelerations of the object.

9. The method of claim 7, further comprising:
receiving second sensor data captured by the one or more sensors, the second sensor data comprising second image data depicting a second object;
inputting, into the trained machine learned model, the second image data;
receiving, from the trained machine learned model and based at least in part on the second image data, a predicted speed of the second object; and
controlling the autonomous vehicle based at least in part on the predicted speed of the second object.

10. The method of claim 7, further comprising:
receiving, from the machine learned model and based at least in part on a pose of the object, a predicted trajectory of the object;
receiving second sensor data associated with the object in the environment at a second time;
determining, based at least in part on the first sensor data and the second sensor data, a measured trajectory of the object from the first time to the second time;
determining a difference between the predicted trajectory of the object and the measured trajectory of the object; and
altering one or more parameters of the machine learned model to minimize the difference to obtain the trained machine learned model.

11. The method of claim 10, further comprising:
receiving third sensor data captured by the one or more sensors, the third sensor data comprising third image data associated with a second object;
inputting, into the trained machine learned model, the third image data;
receiving, from the trained machine learned model and based at least in part on the third image data, a predicted trajectory of the second object; and
controlling the autonomous vehicle based at least in part on the predicted trajectory of the second object.

12. The method of claim 7, wherein the object comprises a pedestrian.

13. The method of claim 7, further comprising:
receiving second sensor data captured by the one or more sensors, the second sensor data comprising:
second image data associated with a second object; and
one or more of lidar data or radar data indicating associated with the second object;
determining, based at least in part on the one or more of lidar data or radar data, a measured movement of the second object;
detecting, based at least in part on the second image data, a pose of the second object in the environment of the one or more sensors; and determining, based at least in part on the pose of the second object, that the measured movement of the second object indicated by the one or more of the lidar data or the radar data is at least partially due to measurement error of the lidar data or radar data.

14. A non-transitory computer-readable medium storing instructions that, when executed, cause one or more processors to perform operations for training a machine learned model to detect object speed, the operations comprising:
  receiving first sensor data captured by one or more sensors at a first time, the first sensor data comprising first image data;
  detecting, based at least in part on the first image data, an object having a pose in an environment of the one or more sensors;
  determining a measured speed of the object at the first time;
  inputting, into a machine learned model, the first image data;
  receiving, from the machine learned model, a predicted speed of the object that is based on the first image data independent of sensor data from other sensor modalities;
  determining a difference between the predicted speed of the object and the measured speed of the object; and
  altering one or more parameters of the machine learned model to minimize the difference to obtain a trained machine learned model to detect object speed.

15. The non-transitory computer-readable medium of claim 14, wherein the first sensor data comprises at least one of historical lidar data, historical radar data, or historical track log data, and
  wherein the historical track log data is indicative of one or more of positions, speeds, velocities, accelerations, extents, or poses of the object over a period of time.

16. The non-transitory computer-readable medium of claim 14, the operations further comprising:
  receiving second sensor data captured by the one or more sensors, the second sensor data comprising second image data depicting a second object;
  inputting, into the trained machine learned model, the second image data;
  receiving, from the trained machine learned model and based at least in part on the second image data, one or more of a predicted speed of the second object or a predicted heading of the second object; and
  controlling the autonomous vehicle based at least in part on the predicted speed of the second object.

17. The non-transitory computer-readable medium of claim 14, the operations further comprising:
  detecting, based at least in part on the first image data, the pose of the object in the environment of the one or more sensors;
  receiving, from the machine learned model and based at least in part on the pose of the object, a predicted trajectory of the object;
  receiving second sensor data associated with the object in the environment at a second time;
  determining, based at least in part on the first sensor data and the second sensor data, a measured trajectory of the object from the first time to the second time;
  determining a difference between the predicted trajectory of the object and the measured trajectory of the object; and
  altering one or more parameters of the machine learned model to minimize the difference to obtain the trained machine learned model.

18. The non-transitory computer-readable medium of claim 17, the operations further comprising:
  receiving third sensor data captured by the one or more sensors, the third sensor data comprising third image data associated with a second object;
  inputting, into the trained machine learned model, the third image data;
  receiving, from the trained machine learned model and based at least in part on the third image data, a predicted trajectory of the second object; and
  controlling the autonomous vehicle based at least in part on the predicted trajectory of the second object.

19. The non-transitory computer-readable medium of claim 14, wherein the pose is indicative of relative appendage positions of the object.

20. The non-transitory computer-readable medium of claim 14, the operations further comprising:
  receiving second sensor data captured by the one or more sensors, the second sensor data comprising:
    second image data associated with a second object; and
    one or more of lidar data or radar data associated with the second object;
  determining, based at least in part on one or more of the first sensor data or second sensor data, a measured movement of the object;
  detecting, based at least in part on the second image data, a pose of the second object in the environment of the one or more sensors; and
  determining, based at least in part on the pose of the second object, that the measured movement of the second object indicated by the one or more of the lidar data or the radar data is at least partially due to measurement error of the lidar data or radar data.

* * * * *